United States Patent Office 3,466,343
Patented Sept. 9, 1969

3,466,343
ALKYLATION METHOD
James J. Tazuma, Stow, Ohio, assignor to The Goodyear Tire & Rubber Company, Akron, Ohio, a corporation of Ohio
No Drawing. Continuation of application Ser. No. 629,406, Apr. 10, 1967. This application Dec. 6, 1968, Ser. No. 785,016
Int. Cl. C07c 3/56
U.S. Cl. 260—671    5 Claims

ABSTRACT OF THE DISCLOSURE

A method of alkylating a benzenoid or polybenzenoid aromatic compound with an olefin is disclosed. The catalyst employed is a combination comprising an alkyl aluminum dihalide and a polyhalide of a transition metal which is selected from the group of tungsten, tin and antimony. The catalyst is dissolved or suspended in the aromatic compound containing a benzenoid or polybenzenoid structure and the olefin is added to this mixture. The alkylation takes place immediately and in substantial yields at temperatures much lower than those of conventional alkylation processes.

---

This application is a continuation of copending application Ser. No. 629,406, now abandoned.

This invention relates generally to the alkylation of benzenoid or polybenzenoid hydrocarbon. More specifically it relates to a novel and rapid method of alkylating aromatic hydrocarbon compounds containing benzenoid or polybenzenoid structures with olefins by the use of a combination of two catalyst components selected from two specific classes of compounds, alkyl aluminum dihalides and a metallic polyhalide selected from tungsten pentahalide, tungsten hexahalide, tin tetrahalide, antimony trihalide and antimony pentahalide.

The term "benzenoid" or "polybenzenoid" as used in this application, is meant to define a six carbon unsaturated hydrocarbon, an example of which is benzene, or a multiple thereof, an example of which is naphthalene.

It is known that most aromatic compounds which contain a benzenoid or polybenzenoid structure may be alkylated by the addition of olefins under conditions which will promote a Friedel Crafts type of reaction. Generally these reactions have been carried out using anhydrous aluminum chloride or borontrifluoride as catalysts and often require the addition of heat to initiate the reaction and require a significant passing of time to effect a substantial conversion into the alkylated aromatic products.

The catalyst composition and method used in the present invention enables the alkylation of the benzenoid or polybenzenoid aromatic compound to initiate itself at room temperature and proceed very rapidly to a high percentage conversion of alkylated aromatic products within a few minutes. Often over 60 percent conversion of the olefins to alkylated benzenoid aromatic compounds occurs within a few minutes after initiating the reaction even at room temperature.

It is therefore an object of this invention to promote a novel and rapid alkylation of a benzenoid aromatic compound with olefins by a unique two-component catalyst system. Another object is to provide a method for the alkylation of aromatic hydrocarbons with either terminal or non-terminal olefins. Still another object is to provide a method for the reaction between terminal and non-terminal olefins and aromatic compounds. Other objects will become apparent as the description proceeds.

According to the present invention aromatic compounds containing benzenoid or polybenzenoid structures are alkylated with olefins by a method which comprises contacting the said aromatic compounds with the two component catalyst system comprising (1) at least one alkyl aluminum dihalide and (2) at least one compound selected from the group consisting of tungsten pentahalide, tungsten hexahalide, tin tetrahalide, antimony trihalide and antimony pentahalide and subsequently adding to this mixture at least one olefin selected from the group consisting of terminal and non-terminal olefins.

The catalyst system employed in this unique and novel process for alkylating such aromatic compounds, as indicated above, is a two-component catalyst system.

The preferred alkyl aluminum dihalides can be represented by the formula $RAlX_2$ wherein R represents an alkyl radical containing at least two and not more than four carbon atoms and X represents chlorine or bromine.

Representative of the preferred alkyl aluminum dihalides are ethyl aluminum dichloride, ethyl aluminum dibromide, n-propyl aluminum dichloride or dibromide, isopropyl aluminum dichloride or dibromide, n-butyl aluminum dichloride or dibromide, isobutyl aluminum dichloride or dibromide and other monoalkyl aluminum dichlorides or dibromides.

Also intended to be included in the scope of the term "alkyl aluminum dihalide" of this invention are methods of producing these alkyl aluminum dihalides "in situ." For instance, the exchange reaction of dialkyl aluminum halides or aluminum trialkyls with additional aluminum halides is contemplated. Representative examples of such reactions are:

$$R_2AlCl + AlCl_3 = 2RAlCl_2$$
$$AlR_3 + 2AlCl_3 = 3RAlCl_2$$

The polyhalide of the transition metal can be represented by the formula $MX_p$. M represents a transition metal, some examples of which are tungsten, tin and antimony. X represents a halide such as a chloride and bromide and p is an integer which can vary from 3 to 6. Representative examples of transition metal halide compounds useful in forming one component of the catalyst system of this invention are $WCl_6$, $WCl_5$, $SnCl_4$, $SbCl_5$ and $SbCl_3$. It is generally preferred to use the catalyst combination of ethyl aluminum dichloride and tungsten hexachloride.

Generally the olefins which are added to the solution or the suspension of the active catalyst complex system in the aromatic medium are the shorter carbon chain olefins with carbon chains of from 1 to 20 carbon atoms and the double bond in the terminal or non-terminal position. However, it is not to be assumed that the length of the carbon chains are to be limited to 20 carbon atoms. The invention will apply to olefins with carbon chain lengths containing more than 20 carbon atoms where these olefins are specified for alkylation of benzenoid or polybenzenoid aromatic hydrocarbons.

Representative among these olefins are ethylene, propylene, 1-butene, 2-butene, 1-pentene, 2-pentene, 1-heptene, 2-heptene, 1-octene and 2-octene. Olefins with side chains, representative of which are 2,3-dimethyl butene-1, 3-methyl heptene-2 and the like, are also useful in the practice of this invention.

The benzenoid or polybenzenoid aromatic compounds used in the practice of this invention are used both as solvents or suspending agents for the catalyst system as well as one of the reactants. Any of the liquid aromatics or aromatics easily liquified by heating are suitable for the practice of this invention so long as these aromatics contain a benzenoid structure. Examples are benzene, toluene, xylene mixtures or the individual xylenes as separated by boiling points, mesitylene, naphthalene, phenanthrene and the like.

The temperatures required for the alkylation reaction of this invention are not critical but may vary between the freezing point and boiling point of the particular aromatic used both as a solvent or suspending agent for the catalyst as well as for a reactant. However, one of the advantages of the present invention lies in the fact that the alkylation reaction proceeds rapidly at ordinary room temperatures when the olefin reactant is added to the solution or suspension of the catalyst system in the aromatic.

In conducting the alkylation reaction of this invention it is usually desirable to employ air-free and moisture-free techniques. It is also desirable to use as pure a hydrocarbon product as possible when selecting the aromatic and olefinic reactants. The catalytic system employed is sensitive to the effects of oxygen and moisture. Compounds containing reactive groups such as OH, $NH_2$, SH and the like, have been found to destroy the activity of the alkylation catalyst of the present invention when present in excess of the molar concentration of the transition metal halide. However, when used in no more than equal molar concentrations with respect to the concentration of the transition metal halide, these active hydrogen-containing compounds have been found to only slightly moderate the activity of the catalyst system.

The catalyst components should be as pure as can economically be obtained and free of deleterious substances.

When the catalysts are employed as a mixture of alkyl aluminum dihalide compound and tungsten halides, the ingredients are employed in amounts so that the alkyl aluminum dihalide to tungsten halide mole ratio (Al/W) ranges from about 1/1 to about 20/1 with from about 2/1 to about 4/1 being preferred. When the catalyst is a mixture of alkyl aluminum dihalide and either tin or antimony halides (Sn or Sb), the Al/Sn or Sb mole ratio should range from about 2/1 to about 20/1 with about 3/1 to about 6/1 being preferred.

The amount of catalyst employed to effect the alkylation has not been shown to be critical. However, sufficient catalyst mixture must be employed to effect the alkylation reaction. An amount of catalyst in large excess of what would be required to effect an efficient reaction would result in economic waste. It has been found that from $1 \times 10^{-4}$ to $3 \times 10^{-4}$ moles of heavy transition metal per mole of benzenoid or polybenzenoid aromatic solvent used will effect an efficient and rapid alkylation, with approximately $2.1 \times 10^{-4}$ moles of heavy transition metal per mole of such aromatic solvent being a preferred ratio.

It has been found that from 0.10 to 0.30 part of total catalyst mixture to 100 parts of such aromatic solution will effect an efficient and rapid alkylation with approximately 0.183 part total catalyst per 100 parts are being most preferred.

There is no definite amount of olefin required to be used during the alkylation process. The desired properties of the end or alkylation product will determine the amount of olefin added. In the practice of this invention all the olefin can be added in one portion to the solution or suspension of catalyst product in aromatic, or the olefin may be metered in at a predetermined rate. It has been found that a mole ratio of approximately 0.40 mole of olefin per mole of benzenoid aromatic promotes a rapid and efficient alkylation reaction.

It is possible that a large excess of olefin, particularly an alpha olefin when all added initially, may result in some polymerization or side reaction involving only the olefin. These polymerization products would appear as impurities in the alkylation product. Ordinarily the alkylation reaction is sufficiently rapid to minimize this side reaction of polymerization of alpha olefins when the olefin is properly added.

Since the alkylation reaction is exothermic, large reaction batches may require cooling. Refrigerated reflux condensation has been successfully used to control temperatures in this type of reaction. Both batch and continuous operation can be used.

The practice of this invention is further described and illustrated by reference to the following examples which are intended to be illustrative rather than restrictive.

EXAMPLE I

To 25 cubic centimeters (cc.) of toluene (dried, $O_2$ free) was added 2 cc. of 0.1 molar ethyl aluminum dichloride in toluene and 1 cc. of 0.05 molar tungsten hexachloride ($WCl_6$) in toluene. To the cooled resultant mixture was added 10 cc. of 2-pentene. A few minutes after the addition about 60% of the olefin had reacted with the aromatic compound. Upon standing overnight (17 hours) only a trace amount of olefin, as free olefin, remained. The alkylated product, which accounted for 87% of the olefin added, consisted of 80% mono alkylated toluene and 20% dialkylated toluene. This amount of product indicates that, on the average, each molecule of co-catalyst promoted the alkylation of toluene with 1300 molecules of olefin.

EXAMPLE II

To a 10 cubic centimeter reactor bottle was added 2 cubic centimeters of a 0.1 molar ethyl aluminum dichloride solution in toluene and 1 cubic centimeter of 0.05 molar tin tetrachloride ($SnCl_4$) solution in toluene. To this mixture was added 2 cubic centimeters of cis-2-pentene. Upon the addition of the olefin the contents of the bottle became quite warm to the touch. A gas chromatographic analysis was conducted which indicated the disappearance of 90 percent of cis-2-pentene. An infrared analysis of the products obtained indicated that the alkylated product formed was predominantly para pentyl toluene similar to that monoalkylated product formed in Example I.

EXAMPLE III

An alkylation similar to that described in Example II was conducted except that one cubic centimeter of a 0.05 molar solution of antimony trichloride ($SbCl_3$) in toluene was substituted for the tin tetrachloride catalyst components. In all other respects the examples are identical. The results obtained are substantially identical to those obtained in Example II.

While certain representative embodiments and details have been shown for the purpose of illustrating the invention, it will be apparent to those skilled in this art that various changes and modifications may be made therein without departing from the spirit or scope of the invention.

What is claimed is:

1. The alkylation process which comprises contacting an aromatic hydrocarbon with a catalyst consisting essentially of (1) at least one alkylaluminum dihalide and (2) a tungsten hexahalide in amounts so that the aluminum/tungsten mole ratio ranges from about 1/1 to about 20/1 and subsequently adding at least one olefin selected from the group of terminal and non-terminal olefins and recovering the alkylated product.

2. The alkylation process according to claim 1 in which the catalyst employed is ethyl aluminum dichloride and tungsten hexachloride.

3. The alkylation process according to claim 1 wherein the aromatic compound is benzene and the olefin is 2-pentene.

4. The alkylation process according to claim 1 in which the aromatic compound is toluene and the olefin compound is 1-pentene.

5. The alkylation process according to claim 1 in which the aromatic compound is benzene and the olefin is propylene.

(References on following page)

References Cited

UNITED STATES PATENTS 3,031,514  4/1962  Kosmin.
3,094,568  6/1963  Hay et al.

FOREIGN PATENTS 957,610  5/1964  Great Britain.

DELBERT E. GANTZ, Primary Examiner
CURTIS R. DAVIS, Assistant Examiner